(12) United States Patent
Norris et al.

(10) Patent No.: US 11,808,318 B2
(45) Date of Patent: Nov. 7, 2023

(54) ACTIVE VIBRATION CONTROL USING CIRCULAR FORCE GENERATORS

(71) Applicant: LORD Corporation, Cary, NC (US)

(72) Inventors: Mark Norris, Cary, NC (US); Stefan Barbulescu, Fuquay-Varina, NC (US); Martin Bieber, Oak Island, NC (US)

(73) Assignee: Lord Corporation, Cary, NC (US)

( * ) Notice: Subject to any disclaimer, the term of this patent is extended or adjusted under 35 U.S.C. 154(b) by 616 days.

(21) Appl. No.: 16/966,788

(22) PCT Filed: Mar. 20, 2019

(86) PCT No.: PCT/US2019/023085
§ 371 (c)(1),
(2) Date: Jul. 31, 2020

(87) PCT Pub. No.: WO2019/183168
PCT Pub. Date: Sep. 26, 2019

(65) Prior Publication Data
US 2020/0408273 A1 Dec. 31, 2020

Related U.S. Application Data

(60) Provisional application No. 62/645,395, filed on Mar. 20, 2018.

(51) Int. Cl.
*F16F 15/00* (2006.01)
*G05D 19/02* (2006.01)
*F16F 7/10* (2006.01)

(52) U.S. Cl.
CPC ........... *F16F 15/002* (2013.01); *G05D 19/02* (2013.01); *F16F 7/1005* (2013.01); *F16F 15/005* (2013.01);

(Continued)

(58) Field of Classification Search
CPC ...... F16F 15/002; F16F 7/1005; F16F 15/005; F16F 2230/08; F16F 2230/18; G05D 19/02
See application file for complete search history.

(56) References Cited

U.S. PATENT DOCUMENTS 4,715,289 A * 12/1987 Okamoto ................ B61F 5/245
267/3
8,190,348 B2 * 5/2012 Gagliano ................ B62D 5/07
701/111

(Continued)

FOREIGN PATENT DOCUMENTS

CA 3089841 C 8/2022
CN 111742159 B 10/2020

(Continued)

OTHER PUBLICATIONS

Chinese Office Action for Application No. 201980009339 dated Jul. 2, 2021.

(Continued)

*Primary Examiner* — Ronald D Hartman, Jr.
(74) *Attorney, Agent, or Firm* — KDW FIRM PLLC

(57) ABSTRACT

Systems, devices, and methods for active vibration control using circular force generators. In one aspect, a vehicle includes a vehicle frame, a cabin, an engine, and a number of vibration control devices mounted on the vehicle frame. Each vibration device includes a circular force generator comprising at least one mass and at least one motor configured to rotate the mass. The vibration control devices are configured to perform active vibration control to reduce noise and/or vibration within the cabin resulting from the engine deactivating a subset of cylinders in operation.

22 Claims, 9 Drawing Sheets

(52) U.S. Cl.
CPC ....... *F16F 2230/08* (2013.01); *F16F 2230/18* (2013.01)

(56) References Cited

U.S. PATENT DOCUMENTS

| | | | |
|---|---|---|---|
| 8,639,399 B2 | 1/2014 | Jolly et al. | |
| 9,458,778 B2* | 10/2016 | Rayl | F02D 41/0087 |
| 10,655,698 B2* | 5/2020 | Lee | B60G 17/0195 |
| 2010/0246086 A1* | 9/2010 | Ishiguro | F16F 13/26 |
| | | | 361/160 |
| 2012/0101691 A1* | 4/2012 | Otsuka | F02D 11/105 |
| | | | 701/48 |
| 2014/0200764 A1* | 7/2014 | Yone | F16F 13/268 |
| | | | 701/36 |
| 2014/0200792 A1* | 7/2014 | Yone | F02D 41/042 |
| | | | 701/102 |
| 2015/0183443 A1* | 7/2015 | Iwamura | F16F 15/03 |
| | | | 188/267 |
| 2015/0307186 A1 | 10/2015 | Swanson et al. | |
| 2015/0321753 A1 | 11/2015 | Swanson et al. | |
| 2015/0353191 A1 | 12/2015 | Jolly et al. | |
| 2015/0370266 A1 | 12/2015 | Norris et al. | |
| 2017/0008620 A1 | 1/2017 | Swanson et al. | |
| 2018/0354353 A1* | 12/2018 | Dudar | B60W 10/06 |
| 2019/0337524 A1* | 11/2019 | Orzechowski | B60W 10/30 |

FOREIGN PATENT DOCUMENTS

| | | | | |
|---|---|---|---|---|
| EP | 1 477 870 A2 | | 11/2004 | |
| JP | 2004036435 A | * | 2/2004 | |
| JP | 2007269049 A | * | 10/2007 | |
| JP | 2015017643 A | * | 1/2015 | |
| JP | 7100708 B2 | | 7/2022 | |
| KR | 102410320 B1 | | 6/2020 | |
| WO | WO-2007129627 A1 | * | 11/2007 | .......... B60G 17/018 |
| WO | WO 2007/147994 A1 | | 12/2007 | |
| WO | WO 2010/068942 | | 6/2010 | |
| WO | WO 2014/138574 A2 | | 9/2014 | |
| WO | WO-2014138574 A2 | * | 9/2014 | .............. B64C 1/40 |
| WO | WO 2016/189075 A1 | | 12/2016 | |

OTHER PUBLICATIONS

Canadian Notice of Allowance for Application No. 3089841 dated Mar. 23, 2022.
Korean Office Action for Application No. 036628195 dated May 18, 2022.
Japanese Notice of Allowance for Application 2020542866 dated May 18, 2022.
Japanese Office Action for Application No. 2020542866 dated Oct. 19, 2021.
International Search Report and Written Opinion for Application No. PCT/US2019/023085 dated Jun. 6, 2020.
Canadian Office Action for Application No. 3089841 dated Aug. 27, 2021.
Korean Office Action for Application No. 084378807 dated Sep. 5, 2021.
European Office Action for Application No. 19715635 dated Jun. 27, 2023.

* cited by examiner

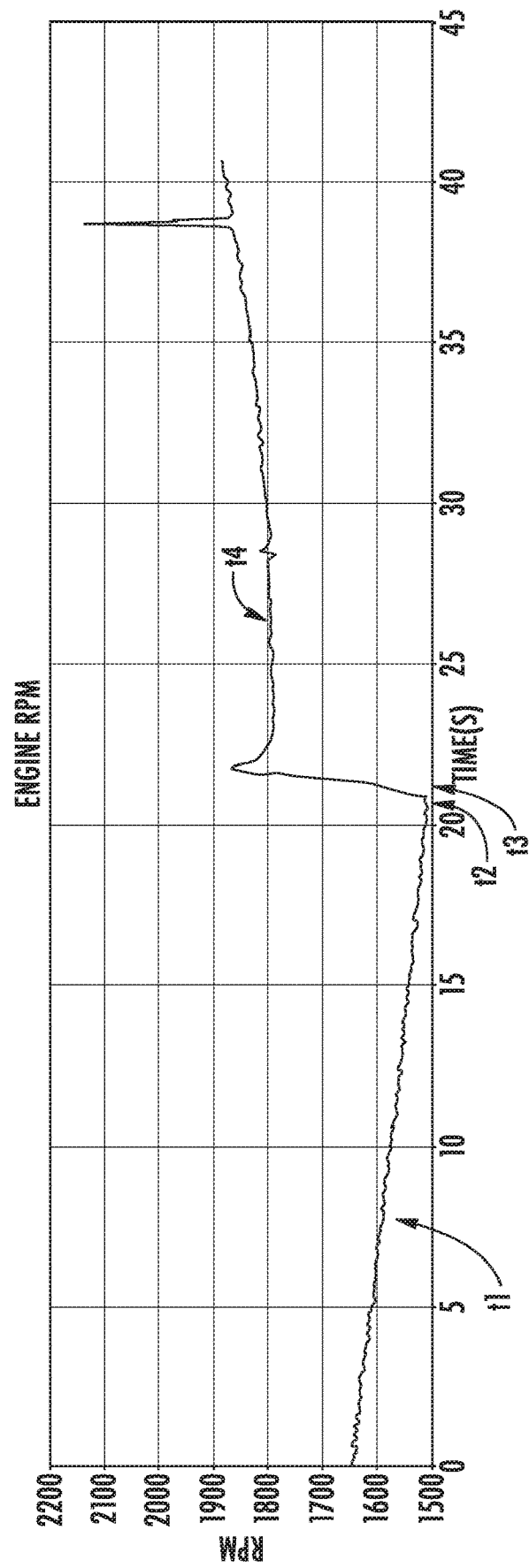

ACTIVE VIBRATION CONTROL USING CIRCULAR FORCE GENERATORS

CROSS-REFERENCE TO RELATED APPLICATIONS

This application claims the benefit of U.S. Provisional Patent Application Ser. No. 62/645,395, filed Mar. 20, 2018, the disclosure of which is incorporated herein by reference in its entirety.

TECHNICAL FIELD

This specification generally relates to the field of active vibration control and more particularly relates to systems, devices, and methods for active vibration control using circular force generators.

BACKGROUND

Linear vibration control technology is used in automotive applications to control vibration induced when engines shut down cylinders during low-power operation to improve efficiency. In doing so, the automobile may feel different to the driver and passengers as the engine now imparts a lower frequency excitation. This can happen in the case of a V-8 engine, for example, when the engine is commanded to shut down 4 cylinders and operate on the remaining 4. When this occurs, the 4 remaining cylinders impart a 2 per engine RPM frequency that the driver and/or passenger can perceive as a problem with the automobile.

Linear technology for broad frequency applications is typically tuned below the operating range which can make the technology heavy and expensive, e.g., due to requiring lots of high-quality metals and rare earth magnetic material to implement. Linear technology is limited in its performance to control complex motions over a wide frequency range. Automotive manufacturers are finding that, to use this technology over varying configurations of vehicles, that they have to reorient the actuators to gain better performance. The motions over these large frequency ranges are quite complex and change significantly with varying structural configurations of the vehicle. As such, some manufacturers may struggle to stream line production lines as they have to implement a complex set of actuator orientations depending on the vehicle configuration, e.g., varying cab configurations, truck bed length, and so on.

SUMMARY

This specification describes systems, devices, and methods for active vibration control using circular force generators. In one aspect, a vehicle includes a vehicle frame, a cabin, an engine, and a number of vibration control devices mounted on the vehicle frame. Each vibration device includes a circular force generator comprising at least one mass and at least one motor configured to rotate the mass. The vibration control devices are configured to perform active vibration control to reduce noise and/or vibration within the cabin resulting from the engine deactivating a subset of cylinders in operation. In cases where the excitation in the vehicle is circular, such as is the case in an engine drive shaft, the CFG technology is much better equipped to generate and control circular excitations within the vehicle as compared to linear technology.

In another aspect, a system for active vibration control includes a data communications network and vibration control devices. Each vibration control device includes a house, a circular force generator within the housing, and a control system within the housing. The circular force generator includes at least one mass and at least one motor configured to rotate the mass. The control system includes a motor control circuit, at least one processor, and memory storing a system-level active vibration control routine. The motor control circuit is configured for controlling the motor to produce a commanded rotating force. The vibration control devices are configured to communicate on the data communications network to select one of the vibration control devices as a master vibration control device, thereby causing the processor of the master vibration control device to execute the system-level active vibration control routine and send force commands to the other vibration control devices such that the vibration control devices collectively produce a vibration cancelling force.

In another aspect, a system for active vibration control includes a vehicle communications network and vibration control devices. Each vibration control device includes a housing, a circular force generator within the housing, and a control system within the housing. The circular force generator includes at least one mass and at least one motor configured to rotate the mass. The control system includes a motor control circuit, at least one processor, and memory storing a look-up table relating vehicle conditions to force commands. The motor control circuit is configured for controlling the motor to produce a commanded rotating force, and the control system is configured to receive vehicle condition data on the vehicle communications network and determine, using the vehicle condition data, a force command for the circular force generator using the look-up table.

BRIEF DESCRIPTION OF THE DRAWINGS

FIGS. 5A-C illustrate, using engine RPM graphs, the effect of a vibration control device altering a force command prior to an imminent gear shift.

DETAILED DESCRIPTION

This specification describes systems, devices, and methods for active vibration control using circular force generators. Circular Force Generator (CFG) technology overcomes at least some of the limitations associated with linear technology. CFGs generate a planar force (and moment) that can more easily control vibration in a complex structural response as compared with linear force technology, especially over large operating frequency ranges.

Figure 1A:
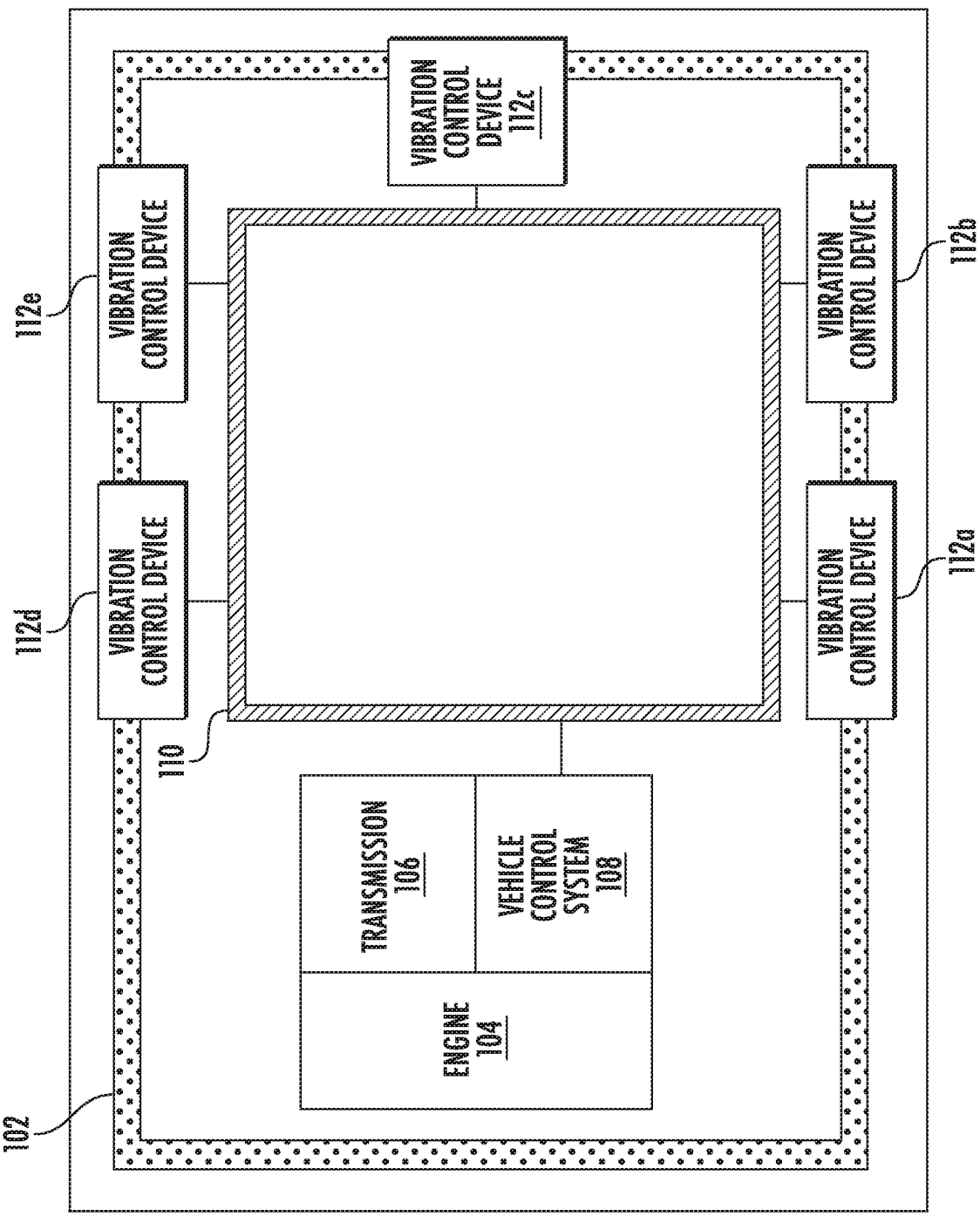
FIGS. 1A-C illustrate a vehicle equipped with an active vibration control system using circular force generators.
Figure 1B:
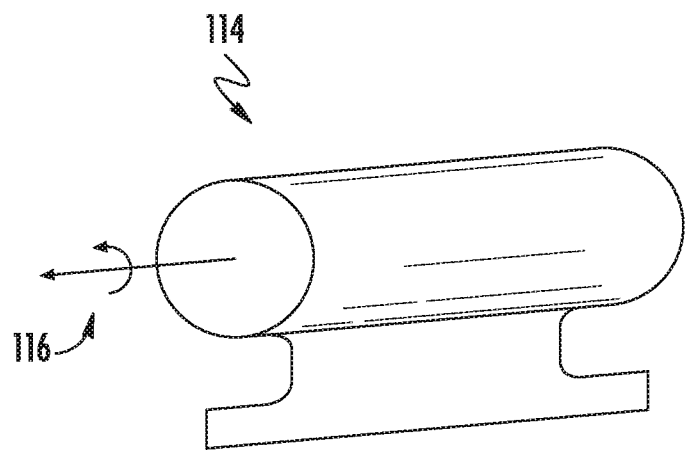
Figure 1C:
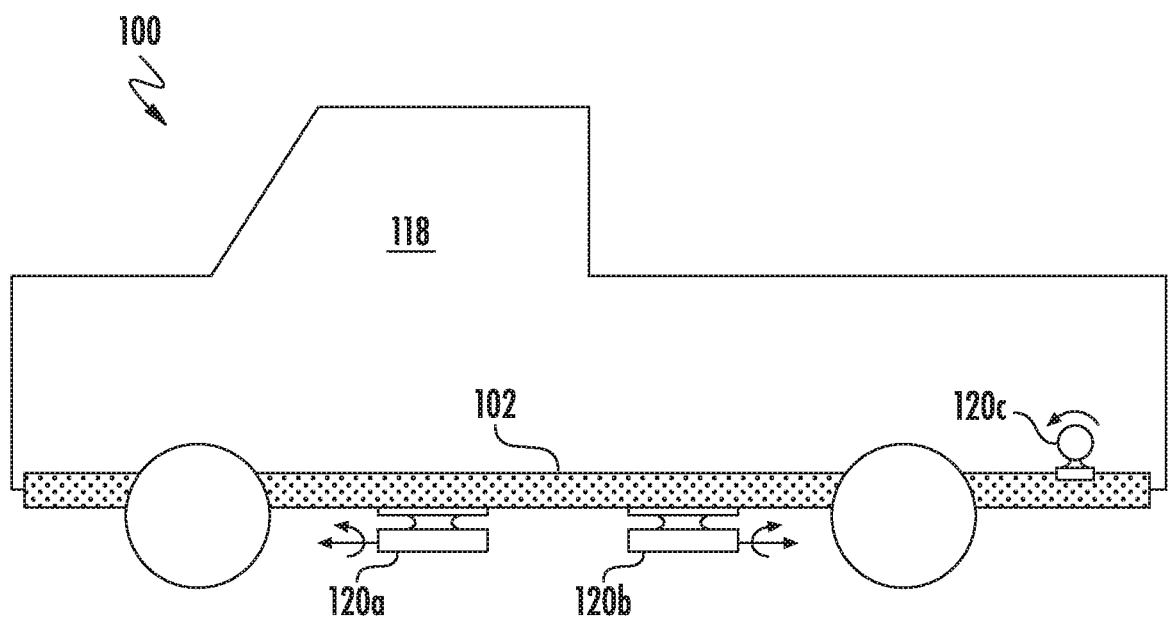

FIGS. 1A-C illustrate a vehicle 100 equipped with an active vibration control system using circular force generators. The vehicle 100 can be any appropriate type of automobile, e.g., a car or a truck. The vehicle 100 is illustrated as a pick-up truck for purposes of illustration.

FIG. 1A is block diagram of the active vibration control system overlaid on an overhead view of the vehicle 100. The vehicle 100 includes a vehicle frame 102, an engine 104, a transmission 106, and a vehicle control system 108. The vehicle 100 includes a wiring harness 110 and a number of vibration control devices 112*a-e* mounted on the vehicle frame 102 and coupled to the wiring harness 110. The wiring harness 110 can be implemented using any appropriate wiring system for providing data and/or power to the vibration control devices 112*a-e*. Each of the vibration control devices 112*a-e* can receive power, e.g., 12-volt power from the vehicle 100, and in some cases, each of the vibration control devices 112*a-e* has individual access to an analog engine tachometer signal. The vibration control devices are configured to perform active vibration control to reduce noise and vibration within a cabin 118 resulting from the engine 104 deactivating a subset of cylinders in operation.

Each of the vibration control devices 112*a-e* includes a circular force generator (CFG). A CFG is a device including at least one mass and at least one motor configured to rotate the mass. FIG. 1B is a schematic diagram illustrating a perspective view of an example CFG 114. FIG. 1B illustrates the spin direction 116 of the CFG 114. Examples of circular force generators are described further below with reference to FIGS. 2A-F.

Each of the vibration control devices 112*a-e* also includes a control system to control the circular force generator. The control system includes a motor control circuit configured for controlling the motor to produce a commanded rotating force. Examples of vibration control devices are described further below with reference to FIG. 3.

FIG. 1C is a schematic diagram illustrating a side view of the vehicle 100 and placement of three example CFGs 120*a-c* on the vehicle frame 102. In general, the CFGs 120*a-c* can be placed at any appropriate location on the vehicle 100, and the number and location of CFGs 120*a-c* can be selected to meet design requirements for particular types of vehicles. As shown in FIG. 1C, two CFGs 120*a-b* are mounted in opposite directions along the length of the vehicle 100 on one side of the vehicle 100, and one CFG 120*c* is mounted perpendicular to the other CFGs 120*a-b* along the width of the vehicle 100.

CFG technology can work more effectively than linear technology because it can produce cancelling motion in a complex structural response over a large operating frequency range. Linear technology is intended to generate only a linear force. CFG technology can be used to create more complex planar forces that not only generate commandable force magnitude and can be distributed to better couple in with complex operating deflection shapes of the frame/vehicle structure and do not have to be reoriented depending on the vehicle configuration.

CFG technology can be implemented in a multitude of ways. CFG technology can be implemented with 2 co-rotating eccentric masses driven by 2 separate motors, where the motors spin at the control frequency, and the magnitude and phase of each eccentric mass are controlled by collocated motor control electronics. In some examples, a central system controller communicates with each CFG in the system to command a force magnitude and relative phase with respect to the engine tachometer. The central system controller drives each CFG to work together to reduce noise and/or vibration in the cabin of the vehicle. In the example shown in FIG. 1A, the vehicle 100 lacks a central system controller, which is possible by virtue of appropriate configuration of the individual vibration control devices 112*a-e* as described further below.

Various architectures of the CFG and control system are possible. Consider the following two examples.

In a first example, the system is comprised of identically configured vibration control devices 112*a-e*, and each are attached to the vehicle 100 on the vehicle frame 102. Each vibration control device 112*a-e* is comprised of motors, electronics, software to generate a force magnitude and relative phase. In addition, each of the vibration control devices 112*a-e* has the capability to run the system control software, e.g., using a Filtered-X algorithm. Moreover, each vibration control device 112*a-e* has an integrated accelerometer (where the accelerometer directions are in the same plane of the CFG force). Each of the vibration control devices 112*a-e* can be powered by the vehicle power bus rail, e.g., the 12 Volt battery, and has access to the analog engine tachometer and vehicle CAN bus, e.g., through the wiring harness 110. During power up, each of the vibration control devices 112*a-e* communicates with one another through CAN bus to determine which device is the "Master" and which device(s) are the "Slave" devices. The Master CFG then implements the System Control Algorithm to reduce vibration at all integrated accelerometers in the system.

In a second example, the system is comprised of identically configured vibration control devices 112*a-e*, and each are attached to the vehicle 100 on the vehicle frame 102. Each vibration control device 112*a-e* is comprised of motors, electronics, software to generate a force magnitude and relative phase. Each of the vibration control devices 112*a-e* is tied into the vehicle CAN bus, e.g., through wiring harness 110, and each receives a signal from the analog engine tachometer. Each of the vibration control devices 112*a-e* stores a look-up table, and depending on parameters such as engine speed, torque, and gear provided through the CAN bus, the vibration control device commands itself (alone) to generate a particular force magnitude and phase depending on the engine parameters. This system would constitute an "open-loop" control architecture.

In some examples, each of the vibration control devices 112*a-e* stores a look-up table and lacks a vibration sensor, such that the vibration control devices 112*a-e* generate force magnitudes and phases using only engine parameters and the look-up table. In some other examples, each of the vibration control devices 112*a-e* stores a look-up table and additional includes a vibration sensor, such that the vibration control devices 112*a-e* generate force magnitudes and phases using, engine parameters, the look-up table, and sensor data from the vibration sensors. In some other examples, each of the vibration control devices 112*a-e* includes a vibration sensor and lacks a look-up table, such that the vibration control devices 112*a-e* generate force magnitudes and phases using sensor data from the vibration sensors and optionally the engine parameters.

In some examples, to improve performance of CFG tracking, especially through gear shifting, each vibration control device 112*a-e* has access to the vehicle CAN bus to allow the vibration control devices 112*a-e* to have advance knowledge of a gear shift event. The vehicle control system 108 commands the vehicle transmission to shift gears using the CAN bus, and as such, this event may take a period of time in milliseconds, which is sufficient to allow the CFG to start to spin up (or down) to maintain better tracking of control during gear shift events (as opposed to the delay generated when using the Engine Tachometer alone to force the CFG to "catch-up"). Tracking of control in this manner is described further below with reference to FIGS. 5A-C.

Figure 2A:
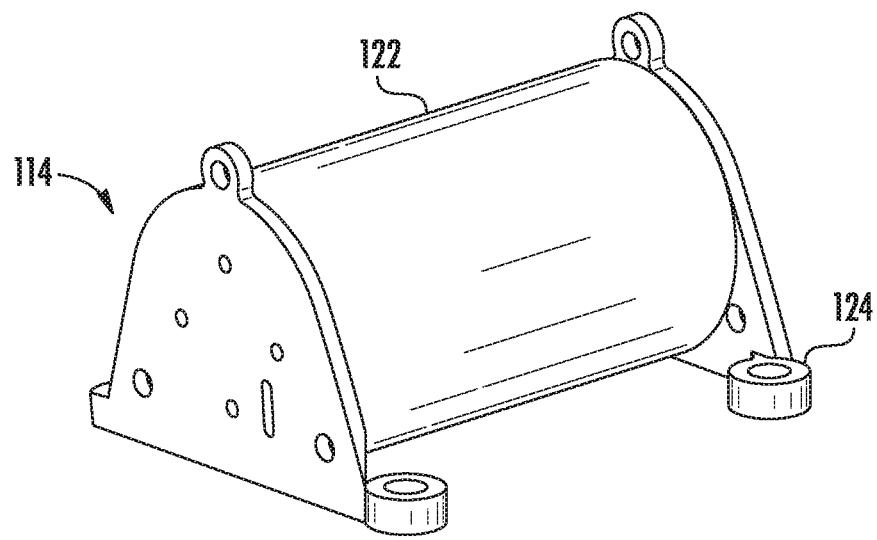
FIGS. 2A-F illustrate an example CFG.
Figure 2B:
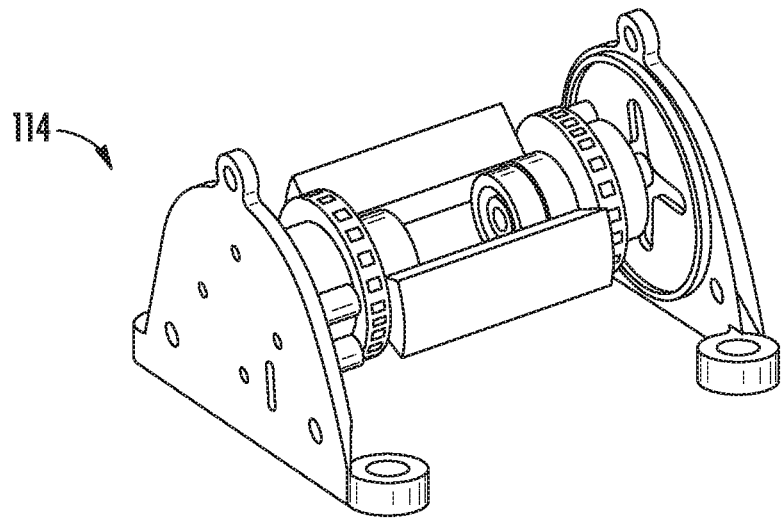
Figure 2C:
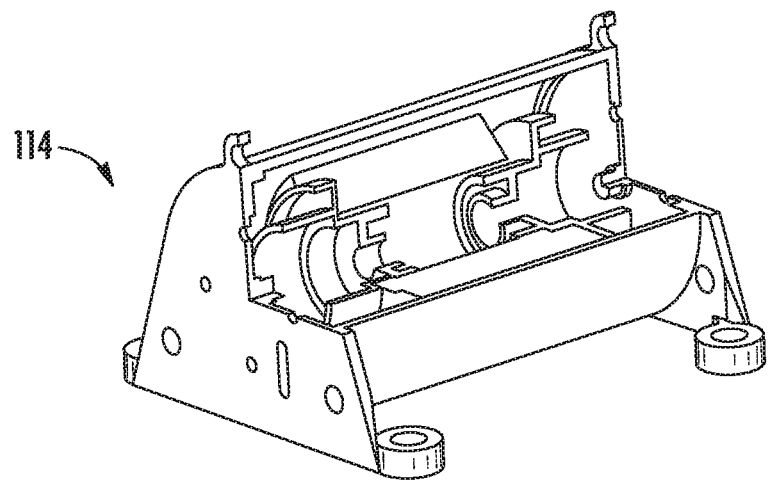

FIGS. 2A-F illustrate an example CFG 114. FIG. 2A shows the CFG 114 and a housing 122 for the CFG 144. The CFG 114 can include a mount 124 for mounting to a vehicle frame. In operation, the housing 122 protects the components of the CFG 114 from, e.g., debris, and the housing 122 can be used to hold control electronics in addition to motors and rotating masses. FIG. 2B shows the CFG 114 with the housing removed for purposes of illustration. FIG. 2C is a cut-away view of the CFG 114 to further illustrate the components of the CFG 114.

Figure 2D:
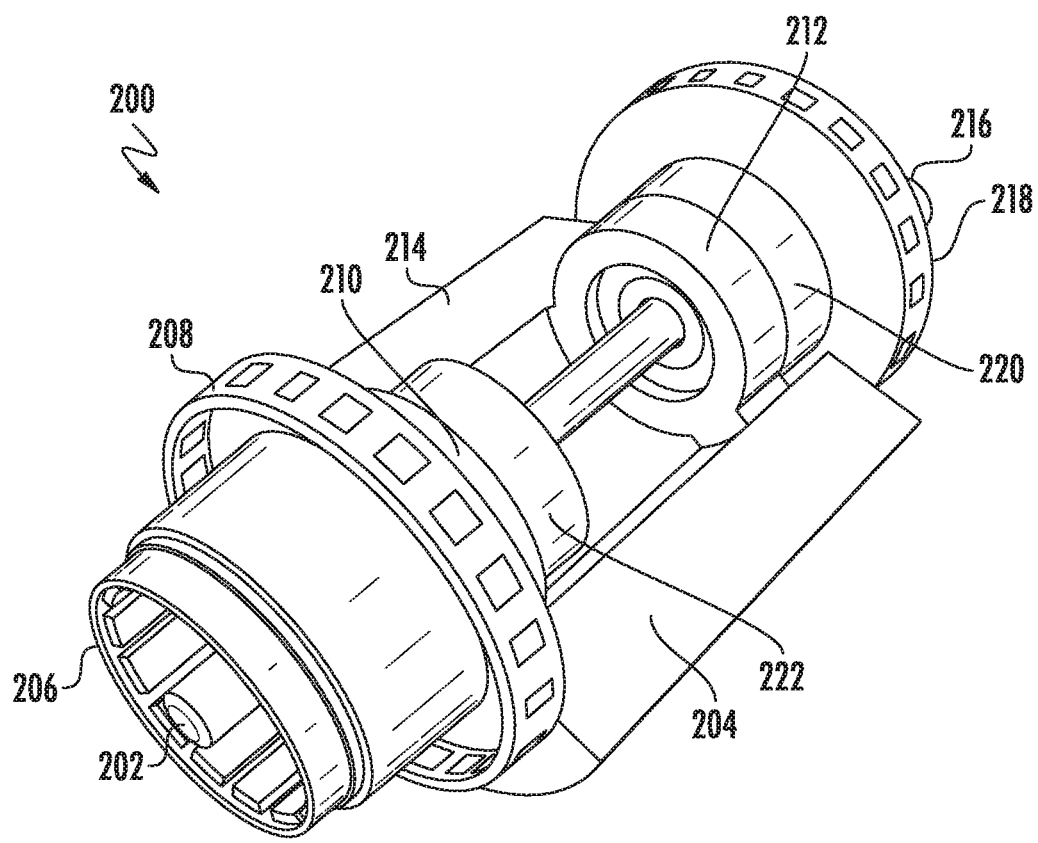

FIG. 2D is a perspective view of a rotor assembly 200 for the CFG 114. The rotor assembly 200 includes a fixed axle 202 and a nested pair of rotors. The rotor assembly 200 includes a first rotor mass 204, a first motor rotor 206, a first motor tone wheel 208 configured for sensing a rotational position of the first motor rotor 206, a first rotor spinning bearing housing 210, and a first rotor non-spinning bearing housing 212. The rotor assembly 200 includes a second rotor mass 214, a second motor rotor 216, a second motor tone wheel 218 configured for sensing a rotational position of the second motor rotor 216, a second rotor spinning bearing housing 220, and a second rotor non-spinning bearing housing 222.

The first rotor mass 204 and the second rotor mass 214 are each rotatable about the fixed axle 202 to generate a combined rotating force. A relative angular position between the first rotor mass 204 and the second rotor mass 214 is selectively adjustable to change a magnitude and phase of the combined rotating force.

Figure 2E:
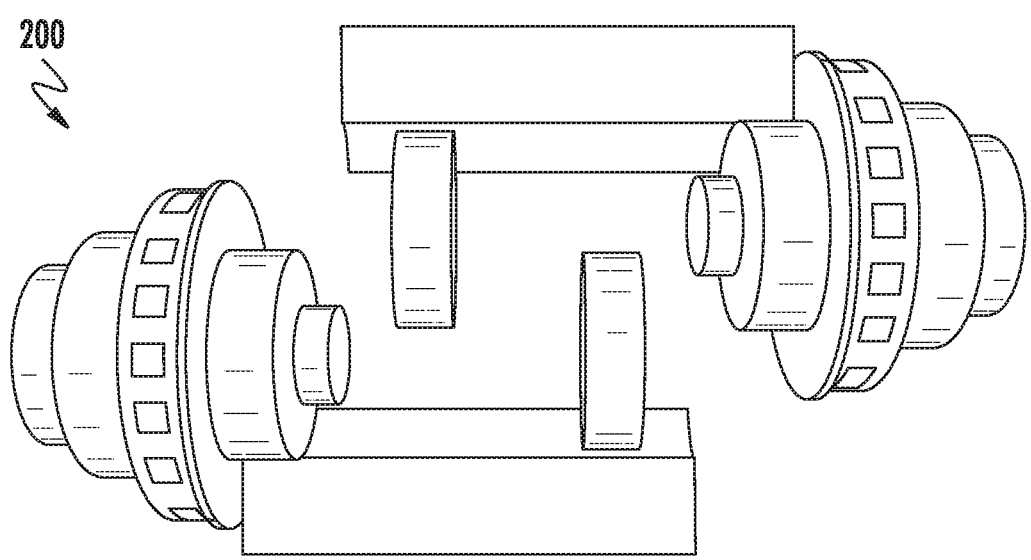
Figure 2F:
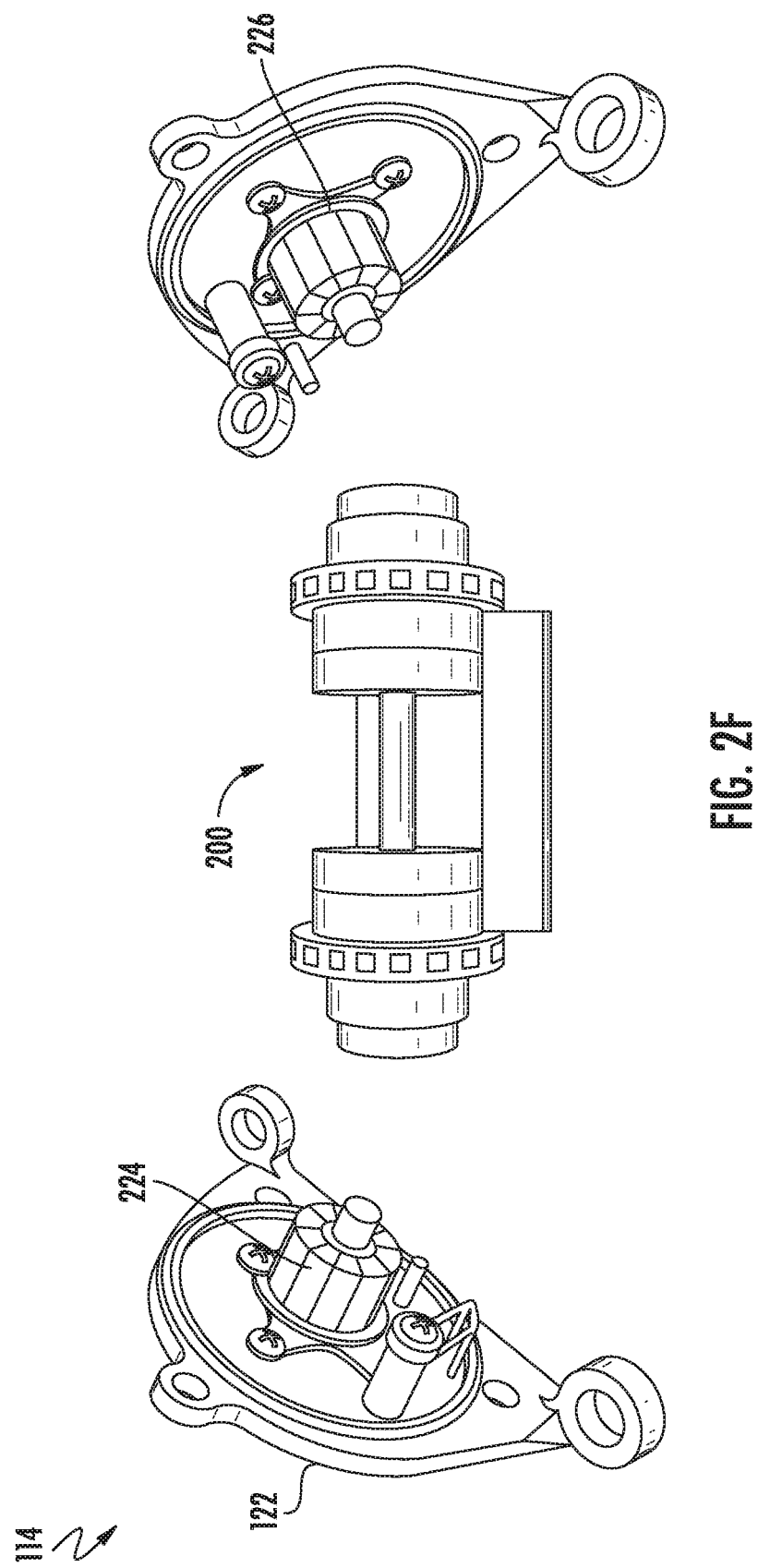

FIG. 2E shows a view of the rotor assembly 200 disassembled for purposes of illustration. FIG. 2F shows a view of the CFG 114 disassembled for purposes of illustration. FIG. 2F shows the rotor assembly 200 with a first motor stator 224 and a second motor stator 226, which can be mounted to the housing 122 of the CFG 114. When assembled, the first and second motors are generally a type of frameless annular motor, e.g., a permanent-magnet synchronous motor (PMSM), such as a 3-phase brushless motor with sinusoidal BEMF.

Figure 3:
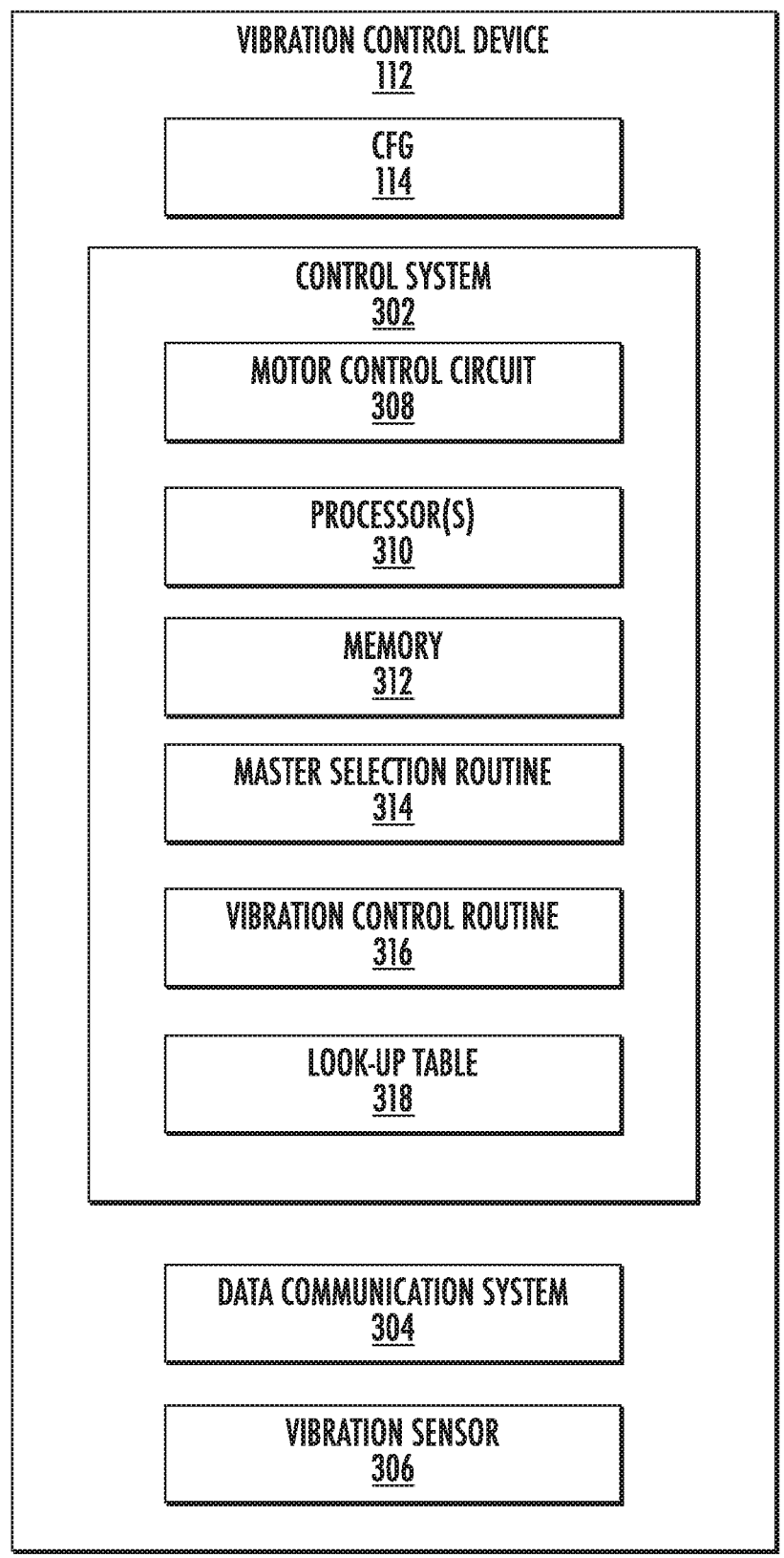
FIG. 3 is a block diagram of an example vibration control device.

FIG. 3 is a block diagram of an example vibration control device 112. The vibration control device 112 includes a CFG 114, a control system 302, a data communication system 304, and a vibration sensor 306. The data communication system 304 can include, e.g., a communications circuit for communicating on a vehicle CAN bus, or any appropriate wired or wireless communication system. The vibration sensor 306 can be, e.g., an accelerometer.

The control system 302 includes a motor control circuit 308 configured for controlling the CFG 114 to produce a commanded rotating force, e.g., by controlling two motors of the CFG 114 to produce a selected relative phase difference between two rotating masses of the CFG 114. For example, the motor control circuit 308 can be implemented using a position sensor for detecting a position of the mass and a servomotor circuit for controlling the motor using the position sensor. The control system 302 includes at least one processor 310 and memory 312 storing executable instructions for the processor 310. The processor 310 and memory 312 can be implemented, e.g., as a microcontroller or other system on a chip.

The control system includes a master selection routine 314 implemented using the processor 310 and the memory 312. The master selection routine 314 is configured to communicate with other vibration control devices to select one of the vibration control devices as a master vibration control device. For example, the control system 302 can execute the master selection routine 314 in response to being powered-on. The master selection routine 314 can use any appropriate selection algorithm, e.g., by generating a random number, sharing the random number with the other vibration control devices, and selecting the vibration control device generating the largest or smallest random number.

The control system 302 includes a vibration control routine 316 implemented using the processor 310 and the memory 312. In some examples, the vibration control routine 314 is a system-level active vibration control routine. If the master selection routine 314 determines that the vibration control device 112 has been collectively selected as a master vibration control device, the control system 302 executes the system-level active vibration control routine and sends force commands to the other vibration control devices such that the vibration control devices collectively produce a vibration cancelling force. The force commands can specify, e.g., a magnitude and a phase of the force, or a force magnitude and a relative phase difference for two rotating masses, or any other appropriate data for controlling a CFG.

The system-level active vibration control routine can receive sensor data from the vibration sensor 306 and from vibration sensors of the other vibration control devices. Then, executing the system-level active vibration control routine includes using the sensor data to determine the force commands. For example, the sensor data can be supplied to an adaptive filter routine, e.g., a filtered-x least mean squares (LMS) routine.

The control system 302 includes a look-up table 318 that can be used by the vibration control routine 316 to determine force commands. The look-up table 318 relates vehicle conditions to force commands. The vibration control routine 316 receives vehicle condition data, e.g., from the vehicle CAN bus, and determines, using the vehicle condition data, a force command for the CFG 114 using the look-up table 318. The vehicle condition data can include one or more of: vehicle speed, transmission gear, engine speed, and engine torque. The vibration control routine 316 can be configured to determine, using the vehicle condition data, that a gear shift is imminent and, in response, alter a force command for the circular force generator prior to the imminent gear shift.

Figure 4:
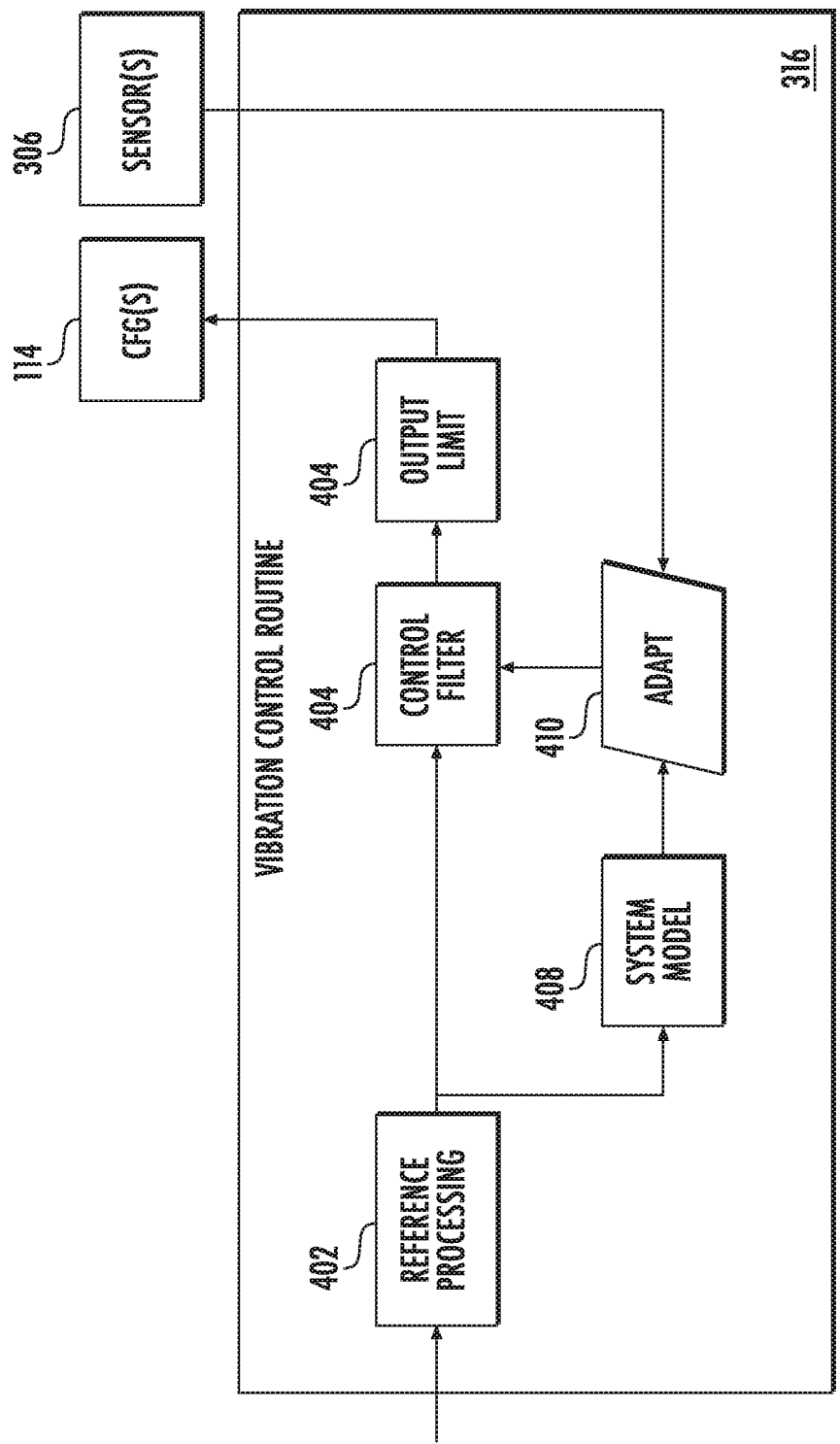
FIG. 4 is a block diagram illustrating an example vibration control routine.

FIG. 4 is a block diagram illustrating an example vibration control routine 314. The vibration control routine 314 includes a reference processing block 402 that receives an input for vehicle condition data, e.g., an analog tachometer signal. The vibration control routine 314 includes a control filter 404 that modifies the input signal amplitude and phase to output a vibration cancelling signal. The vibration control routine 314 can include an output limit block 406 to limit the output signal based on the capabilities of the CFG 114.

The vibration control routine 314 includes a filter adapting block 410 that adjusts the control filter 404 to reduce or minimize an error signal received from one or more vibration sensors 306. The vibration control routine 314 includes a system model 408, which can include a transfer function from the output signal to the error signal and is created during system model calibration. The filter adapting block 410 uses the system model 408 and the error signal to adjust filter coefficients in the control filter 404.

Figure 5B:
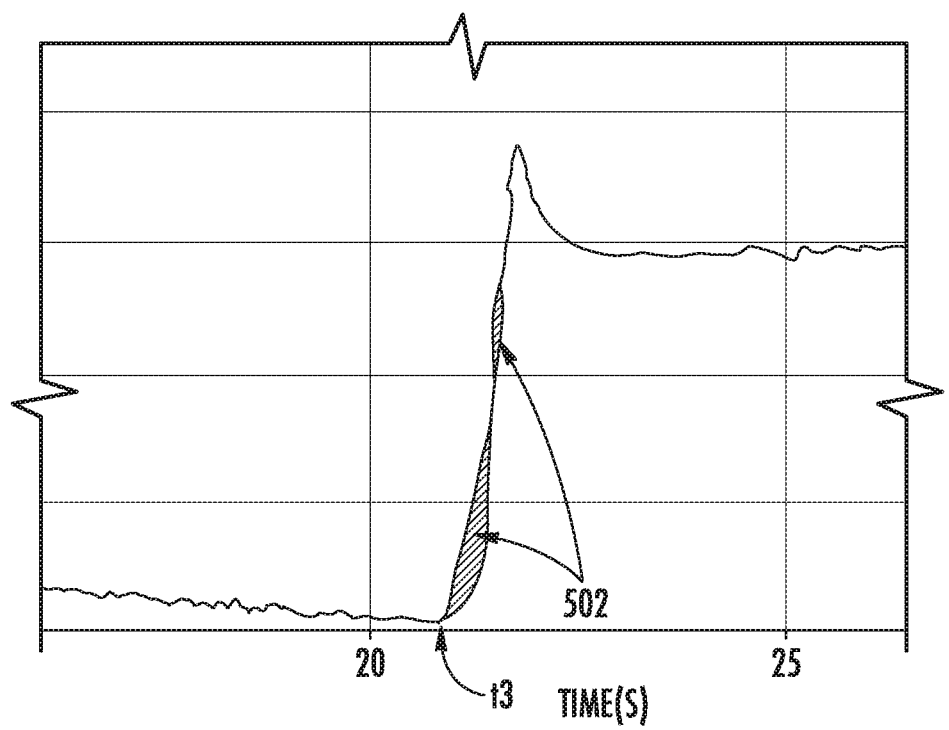
Figure 5C:
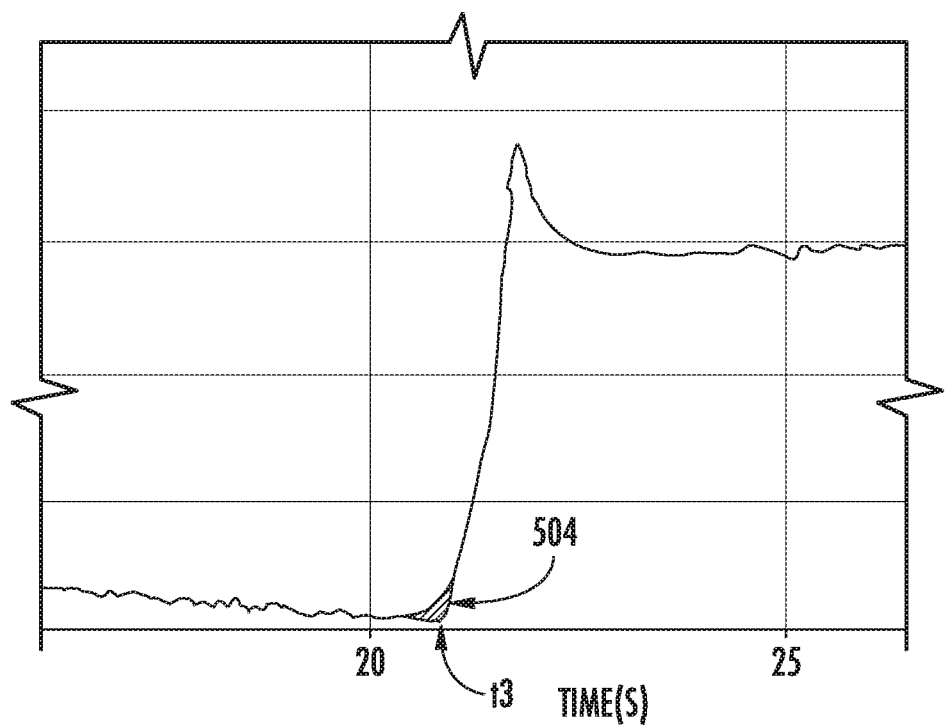

FIGS. 5A-C illustrate, using engine RPM graphs, the effect of a vibration control device altering a force command prior to an imminent gear shift. FIG. 5A shows a graph with engine RPM on the vertical axis and time on the horizontal axis. The graph illustrates a gear shift from third gear, at time t1, to second gear, at time t4. At time t2, the vehicle control system sends data on the vehicle CAN bus indicating that a gear shift is imminent, e.g., a command to the transmission to cause the gear shift. At time t3, the transmission begins to execute the gear shift.

FIG. 5B shows a portion of the graph that illustrates tracking error in the event that the vibration control device does not use the data on the vehicle CAN bus indicating that the gear shift is imminent. The tracking error is illustrated as the dashed area 502 between the engine RPM and a vibration control device force command. The vibration control device attempts to catch-up with the fast change in engine RPM.

FIG. 5C shows a portion of the graph that illustrates reduced tracking error when the vibration control device uses the data on the vehicle CAN bus indicating that the gear shift is imminent. The tracking error is illustrated as the dashed area 504 between the engine RPM and a vibration control device force command. The vibration control device can begin altering the force commands prior to the gear shift so that it doesn't have to catch-up with the fast change in engine RPM.

The embodiments described herein are examples only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A vehicle comprising:
   a vehicle frame;
   a cabin;
   an engine; and
   a plurality of vibration control devices mounted on the vehicle frame, each vibration control device comprising a circular force generator comprising at least one mass and at least one motor configured to rotate the mass, wherein the vibration control devices are configured to perform active vibration control to reduce noise and/or vibration within the cabin resulting from the engine deactivating a subset of cylinders in operation.

2. The vehicle of claim 1, wherein each vibration control device includes a nested pair of rotors and a control system comprising: a motor control circuit, an accelerometer, at least one processor, and memory storing an active vibration control routine, wherein the motor control circuit is configured for controlling the motor to produce a commanded rotating force.

3. The vehicle of claim 1, comprising a data communications bus coupled to a vehicle control system, wherein each vibration control device is coupled to the data communications bus and is configured to receive, on the data communications bus, vehicle condition data including one or more of: vehicle speed, transmission gear, engine speed, and engine torque.

4. The vehicle of claim 3, wherein at least one of the vibration control devices is configured to determine, using the vehicle condition data, that a gear shift is imminent and, in response, alter a force command for the circular force generator prior to the imminent gear shift.

5. The vehicle of claim 3, wherein at least one of the vibration control devices comprises at least one processor and memory storing a look-up table relating a plurality of vehicle conditions to a plurality force commands, and wherein the at least one vibration control device is configured to determine, using the vehicle condition data, a force command for the circular force generator using the look-up table.

6. The vehicle of claim 1, wherein the vibration control devices are configured to communicate with each other to select one of the vibration control devices as a master vibration control device, thereby causing a processor of the master vibration control device to execute a system-level active vibration control routine and send force commands to the other vibration control devices such that the vibration control devices collectively produce a vibration cancelling force.

7. The vehicle of claim 1, wherein each of the vibration control devices comprises at least one processor and memory storing a look-up table relating a plurality of vehicle conditions to a plurality force commands, wherein each vibration control device is configured to determine, using vehicle condition data, a force command for the circular force generator using the look-up table.

8. The vehicle of claim 1, wherein each of the vibration control devices comprises a vibration sensor and each of the vibration control devices is configured to determine, using sensor data from the vibration sensor, a force command for the circular force generator.

9. A system for active vibration control, the system comprising:
   a data communications network; and
   a plurality of vibration control devices, each vibration control device comprising:
      a housing;
      a circular force generator within the housing, the circular force generator comprising at least one mass and at least one motor configured to rotate the mass;
      a control system within the housing, the control system comprising a motor control circuit, at least one processor, and memory storing a system-level active vibration control routine, wherein the motor control circuit is configured for controlling the motor to produce a commanded rotating force;
   wherein the vibration control devices are configured to communicate on the data communications network to select one of the vibration control devices as a master vibration control device, thereby causing the processor of the master vibration control device to execute the system-level active vibration control routine and send force commands to the other vibration control devices such that the vibration control devices collectively produce a vibration cancelling force.

10. The system of claim 9, wherein each vibration control device comprises a vibration sensor, and wherein each vibration control device is configured to send sensor data from the vibration sensor of the vibration control device to the master vibration control device, and wherein executing the system-level active vibration control routine comprises using the sensor data from the vibration sensors to determine the force commands.

11. The system of claim 10, wherein each vibration sensor comprises an accelerometer and oriented with the circular force generator.

12. The system of claim 10, wherein executing the system-level active vibration control routine comprises supplying the sensor data from the vibration sensors to an adaptive filter routine.

13. The system of claim 12, wherein the adaptive filter routine is a filtered-x least mean squares (LMS) routine.

14. The system of claim 9, wherein each circular force generator comprises a pair of nested rotors, and wherein the commanded rotating force comprises a force magnitude and a relative phase.

15. The system of claim 9, wherein each motor control circuit comprises a position sensor for detecting a position of the mass and a servomotor circuit for controlling the motor using the position sensor.

16. The system of claim 9, the housing comprising a mount for mounting to a vehicle frame and electronics connector for connecting to a wiring harness.

17. A system for active vibration control, the system comprising:
a vehicle communications network; and
a plurality of vibration control devices, each vibration control device comprising:
a housing;
a circular force generator within the housing, the circular force generator comprising at least one mass and at least motor configured to rotate the mass;
a control system within the housing, the control system comprising a motor control circuit, at least one processor, and memory storing a look-up table relating a plurality of vehicle conditions to a plurality force commands, wherein the motor control circuit is configured for controlling the motor to produce a commanded rotating force, and wherein the control system is configured to receive vehicle condition data on the vehicle communications network and determine, using the vehicle condition data, a force command for the circular force generator using the look-up table.

18. The system of claim 17, wherein the vehicle condition data includes one or more of: vehicle speed, transmission gear, engine speed, and engine torque.

19. The system of claim 17, wherein at least one of the vibration control devices is configured to determine, using the vehicle condition data, that a gear shift is imminent and, in response, alter a force command for the circular force generator prior to the imminent gear shift.

20. The system of claim 17, wherein each vibration control device comprises a vibration sensor, and wherein the control system of each vibration control device is configured to determine the force command using sensor data from the vibration sensor.

21. The system of claim 20, wherein each vibration sensor comprises an accelerometer and oriented with the circular force generator.

22. The system of claim 20, wherein each circular force generator comprises a pair of nested rotors, and wherein the commanded rotating force comprises a force magnitude and a relative phase.

* * * * *